United States Patent
Clevorn et al.

(10) Patent No.: US 9,144,020 B2
(45) Date of Patent: Sep. 22, 2015

(54) DYNAMIC RXDIV FOR IDLE MODE IN A USER EQUIPMENT

(75) Inventors: Thorsten Clevorn, Munich (DE); Roland Hellfajer, Bochum (DE)

(73) Assignee: Intel Deutschland GmbH, Neubiberg (DE)

( * ) Notice: Subject to any disclaimer, the term of this patent is extended or adjusted under 35 U.S.C. 154(b) by 159 days.

(21) Appl. No.: 13/423,719

(22) Filed: Mar. 19, 2012

(65) Prior Publication Data
US 2013/0244665 A1 Sep. 19, 2013

(51) Int. Cl.
*H04W 36/00* (2009.01)
*H04W 52/02* (2009.01)
*H04B 7/08* (2006.01)
*H04B 17/382* (2015.01)
*H04B 17/318* (2015.01)
*H04B 17/336* (2015.01)

(52) U.S. Cl.
CPC ......... *H04W 52/0245* (2013.01); *H04B 7/0871* (2013.01); *H04B 17/382* (2015.01); *H04W 52/028* (2013.01); *H04B 17/318* (2015.01); *H04B 17/336* (2015.01)

(58) Field of Classification Search
CPC .............................. H04B 17/00; H04B 7/0871
USPC ............ 455/437, 140, 135; 375/130; 370/311
See application file for complete search history.

(56) References Cited

U.S. PATENT DOCUMENTS

| | | | |
|---|---|---|---|
| 5,640,414 A * | 6/1997 | Blakeney et al. ............. | 375/130 |
| 6,070,086 A | 5/2000 | Dobrica | |
| 6,144,861 A | 11/2000 | Sundelin et al. | |
| 6,278,869 B1 * | 8/2001 | Lindenmeier et al. ..... | 455/277.1 |
| 6,904,290 B1 | 6/2005 | Palenius | |
| 7,437,175 B2 | 10/2008 | Lindoff et al. | |
| 7,489,913 B2 * | 2/2009 | Welnick et al. ............... | 455/140 |
| 7,929,985 B2 | 4/2011 | Khayrallah et al. | |
| 8,538,472 B2 | 9/2013 | Dawid et al. | |

(Continued)

FOREIGN PATENT DOCUMENTS

| | | |
|---|---|---|
| EP | 1216522 B1 | 6/2002 |
| WO | 9952226 A1 | 10/1999 |
| WO | 2007074285 A1 | 7/2007 |

OTHER PUBLICATIONS

Notice of Allowance dated May 1, 2013 for U.S. Appl. No. 12/967,180.

(Continued)

*Primary Examiner* — Charles Shedrick
(74) *Attorney, Agent, or Firm* — Eschweiler & Associates, LLC

(57) ABSTRACT

A method of evaluating a reception quality of a receiver includes determining a reception quality of the receiver using a measurement from a single active antenna of the receiver if the receiver is in the idle mode. The method further includes activating receiver diversity by activating at least a second antenna of the receiver in the idle mode if the measurement from the single active antenna of the receiver is below a first predetermined reception quality threshold. A receiver includes receiver chains configured to interface with respective antennas, and a reception quality estimation unit configured to determine a reception quality of a single active receive chain when the receive is in an idle mode. The receiver further includes a diversity controller configured to selectively activate at least a second receive chain in the idle mode based on the determined reception quality from the reception quality estimation unit.

20 Claims, 7 Drawing Sheets

(56) References Cited

U.S. PATENT DOCUMENTS

| | | | |
|---|---|---|---|
| 2002/0013136 A1* | 1/2002 | Meijer | 455/272 |
| 2004/0106441 A1 | 6/2004 | Kazakevich et al. | |
| 2004/0253955 A1* | 12/2004 | Love et al. | 455/442 |
| 2005/0197080 A1* | 9/2005 | Ulupinar et al. | 455/135 |
| 2006/0246937 A1 | 11/2006 | Lindoff | |
| 2006/0252447 A1 | 11/2006 | Muharemovic et al. | |
| 2007/0188380 A1* | 8/2007 | Duong et al. | 342/374 |
| 2008/0051046 A1 | 2/2008 | Ruckriem | |
| 2008/0214224 A1 | 9/2008 | Ostman et al. | |
| 2008/0220819 A1 | 9/2008 | Ben-Eli | |
| 2009/0086682 A1 | 4/2009 | Kazmi et al. | |
| 2009/0180413 A1* | 7/2009 | Sutton | 370/311 |
| 2013/0288624 A1* | 10/2013 | Mujtaba et al. | 455/140 |

OTHER PUBLICATIONS

U.S. Appl. No. 13/955,481, filed Jul. 31, 2013. 56 Pages.
Office Action dated Jan. 17, 2013 for U.S. Appl. No. 12/967,180.
3GPP TS 25.101 V7.16.0. "3rd Generation Partnership Project; Technical Specification Group Radio Access Network; User Equipment (UE) Radio Transmission and Reception (FDD) (Release 7)." 32 Pages, May 2009.
3 GPP TS 25.214 V7.15.0. "3rd Generation Partnership Project; Technical Specification Group Radio Access Network; Physical Layer Procedures (FDD) (Release 7)." 44 Pages, Mar. 2010.
3 GPP TS 34.121-1 V7.6.0. "3rd Generation Partnership Project; Technical Specification Group Radio Access Network; User Equipment (UE) Conformance Specification; Radio Transmission and Reception (FDD); Part 1: Conformance Specification (Release 7)." 7 Pages, Sep. 2007.
3 GPP TS 34.121-1 V8.9.0. "3rd Generation Partnership Project; Technical Specification Group Radio Access Network; User Equipment (UE) Conformance Specification; Radio Transmission and Reception (FDD); Part 1: Conformance Specification (Release 8)." 23 Pages, Dec. 2009.
U.S. Appl. No. 12/967,180, filed Dec. 14, 2010.
Office Action dated Jun. 18, 2015 in connection with U.S. Appl. No. 13/955,481.

* cited by examiner

DYNAMIC RXDIV FOR IDLE MODE IN A USER EQUIPMENT

FIELD

This invention relates to a user equipment (UE) performing a dynamic activation/deactivation of receive diversity (RxDiv) in an idle mode, and a method of dynamically activating and deactivating receive diversity in an idle mode.

BACKGROUND

In mobile communications between a base station (BS) and a user equipment (UE), diversity receivers are used in the user equipment to improve the reception of radio signals sent by the base station. Therefore diversity receivers improve the quality of the received signal. The use of receive diversity, however, leads to significantly increased power consumption, considerably reducing the available stand-by.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
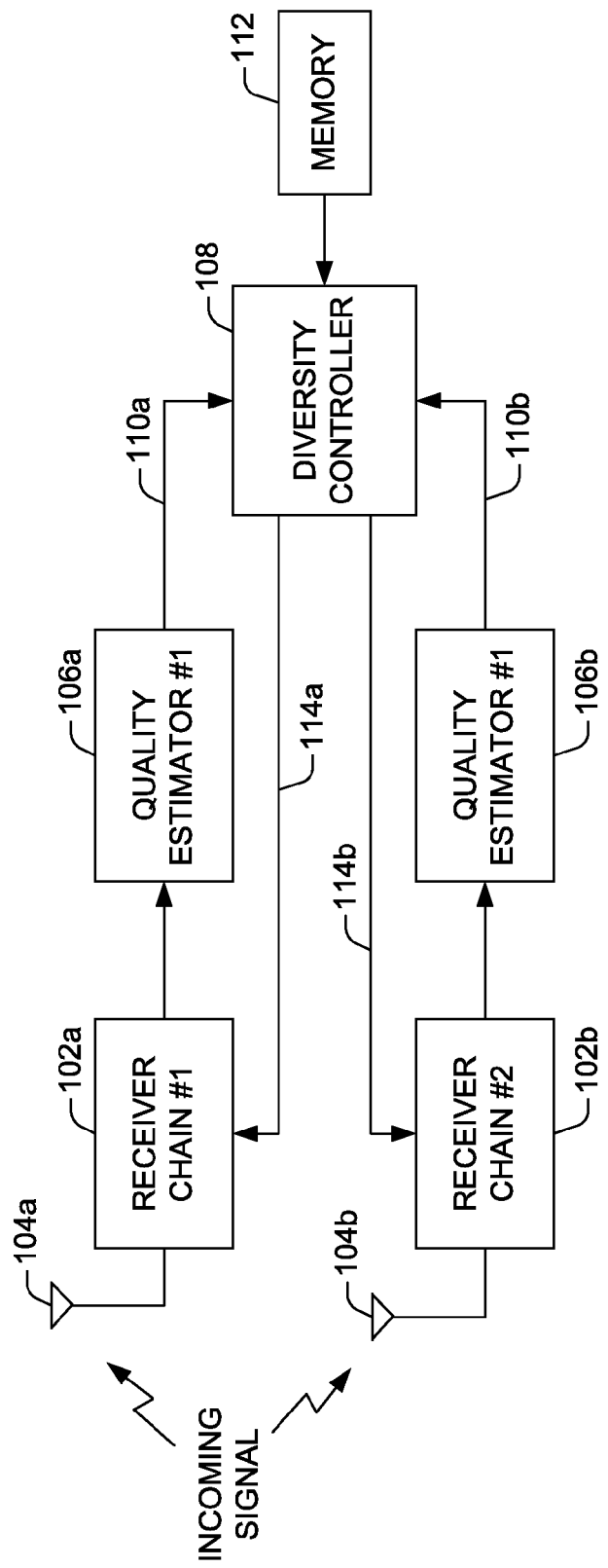
FIG. 1 is a block diagram illustrating a user equipment employing receive diversity according to one embodiment.

In the following detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

As employed in this Specification, the terms "coupled" and/or "electrically coupled" are not meant to mean that the elements must be directly coupled together; intervening elements may be provided between the "coupled" or "electrically coupled" elements.

User equipments are devices that may include antennas, receiver circuits, and transmitter circuits, and may include signal-to-interference-ratio (SIR) estimation units, diversity controllers and memory are described below.

Antennas are transducers that transmit or receive electromagnetic waves. In other words, antennas convert electromagnetic radiation into electrical current, or vice versa. Antennas generally deal in the transmission and reception of radio waves. Antennas are used in systems such as radio communications, wireless LAN, cell phones and mobile communications. Antennas in the user equipment receive radio signals from a base station and convert these signals into electrical signals that are the received signals.

Radio signals are radio frequency signals that are radiated by a radio transmitter (sender) with a radio frequency (RF) in the range of about 3 Hz to 300 GHz, for example. This range corresponds to the frequency of alternating current electrical signals used to produce and detect radio waves.

The use of multiple antennas in a user equipment results in improved overall system performance due to the use of diversity techniques. Receiver diversity (RxDiv) or antenna diversity, is a wireless diversity scheme that uses two or more antennas to improve the quality and reliability of a wireless link. In some instances, such as in urban and indoor environments, there is not a clear line-of sight (LOS) between the transmitter and the receiver. Instead, the signal is reflected along multiple paths before finally being received. Each of these bounces can introduce phase shifts, time delays, attenuations, and even distortions that can destructively interfere with one another at the aperture of the receiving antenna. Receive diversity is effective at mitigating these multipath situations because multiple antennas offer a receiver several observations of the same signal. Each antenna will experience a different interference environment. Thus, if one antenna is experiencing a deep fade, it is likely that another has a sufficient signal. Collectively such a system can provide a robust link.

Receiver circuits, sometimes referred to as receiver chains, are coupled to a respective antenna in order to process the received signal of the antenna. Receiver circuits may include Rake receivers and/or equalizers or other suitable receivers.

Downlink signals are signals transmitted in downlink direction, i.e. from a base station to the user equipment. Downlink signals carry downlink channels. In WCDMA a user terminal may be allocated one or more Data Channels (DCHs) or Dedicated Physical Data Channels (DPDCHs) which carry user bits. A user terminal may also be allocated a Physical Control Channel (PCCH) or a Dedicated Physical Control Channel (DPCCH) on which overhead control information is carried to the user, e.g. bit rate information of the associated DCHs, transmit power control bits and pilot symbols, which can be used to perform the noise measurements, such as SIR measurements, in the fast power control loop process.

Rakes are rake receivers or generalized-rake (G-Rake) receivers that exploit multi-path information of the received radio signal. A rake can be utilized to counter the effects of multipath fading. This can be achieved by using several sub-equalizers or "fingers", that is, several correlators each assigned to a different multi-path component. Each finger independently equalizes a single multi-path component, and at a later stage the contribution of some or all fingers are combined in order to make use of the different transmission characteristics of each transmission path. This results in a higher signal-to-noise ratio in a multi-path environment. By using rakes, different paths with different delays can be effectively combined to obtain the path diversity gain. Due to narrow transmission pulses and a large transmission bandwidth of the radio channel, the resulting inter-symbol interference (ISI) and a long delay spread in the characterization of the radio channel may be overcome by using the rake. A rake output signal is provided at an output of the rake.

Equalizers equalize effects of the radio channel on the received radio signal, such as delay or multipath fading by applying the inverse channel impulse response to the received signal in order to reconstruct the original transmitted signal. The inverse of the channel impulse response may be stored in an array, e.g. forming an FIR filter and may be updated by an adaptive algorithm. An estimation of the transmitted signal is provided as equalized signal at an output of the equalizer.

Receiver circuits (i.e., receiver chains) may include mixers for mixing the received signals down to baseband, demodulators for demodulating the received signals and decoders for decoding the received signals. Demodulation is the inverse operation of modulation which is performed in the base station transmitter, e.g. a UMTS transmitter. By way of example, the modulation scheme (constellation) in UMTS transmitters is quadrature phase shift keying (QPSK) or quadrature amplitude modulation, e.g. 16QAM or 256QAM. Modulation is a process where the transmitted symbols are multiplied with the carrier signal obtaining a signal to be transmitted. Demodulation is the inverse process multiplying the received signal with the carrier signal to obtain the original transmitted symbols. The modulating symbols are called chips, and their modulating rate may, for example, be 3.84 Mcps.

Quality estimation units perform estimates of various performance criteria associated with the user equipment to ascertain a noise environment as well as other conditions associated therewith. The quality measure may be a signal-to-noise ratio (SNR), a signal-to-interference-plus-noise ratio (SIR), an absolute power of the downlink signal measured at the user equipment, an error rate or any other quality measure. The quality estimator may monitor known signal patterns such as pilot symbols in the received downlink signal over a specified time interval in order to estimate a quality measure. As stated above, one type of quality estimation unit is a signal-to-interference-plus-noise-ratio (SIR) estimation unit (sometimes also called an SINR). SIR estimation units perform estimation of SIR values of the downlink signals after demodulation. The signal-to-interference-plus-noise ratio (SIR) is the quotient between the average received modulated signal power and the sum of the average received interference power and the received noise. The interference power may be generated by other transmitters than the useful signal. Interference is anything which alters, modifies, or disrupts a signal as it travels along a channel between a source and a receiver. In Wideband CDMA systems, this kind of interference is frequently called other-cell interference. Additionally, there is own-cell interference or inter-path interference. In a frequency selective transmission channel, the signal travels from the transmitter to the receiver along different transmission paths which are characterized by different propagation delays and uncorrelated fading. These multiple transmission paths interfere with each other, hence the resulting interference is called inter-path interference. Another type of quality estimation unit simply measures received signal power. Other types of estimating reception quality also exist, and such variations are all contemplated as falling with the scope of the present disclosure.

SIR estimation is performed by an SIR estimation unit which may be an electrical circuit for estimation of SIR. The SIR estimation unit estimates the received power of the downlink channel to be power controlled and the received interference and noise on this downlink channel. For DPCH channels, the signal power and the interference and noise power may be estimated by using pilot symbols, i.e., known symbols transmitted on one or more downlink channels.

Diversity controllers are used to control diversity receivers including receiver circuits. Diversity receivers enhance reliability by minimizing the channel fluctuations due to fading. The central idea in diversity, as highlighted supra, is that different antennas receive different versions of the same signal. The chances of all these copies being in a deep fade is small. This solution therefore is advantageous when the fading is independent from element to element, and are of limited use (beyond increasing the SNR) if perfectly correlated (such as in line-of-sight conditions). Independent fading would arise, for example, in a dense urban environment where the several multipath components add up very differently at each element.

Each receiver element or receiver chain of a diversity receiver, therefore, receives an independent sample of the random fading process, i.e., an independent copy of the transmitted signal. In the diversity receiver these independent samples are combined under control of the diversity controller in order to achieve the desired goal of increasing the SNR and reducing the bit error rate (BER). The diversity controller may select individual receiver circuits in the diversity receiver for data processing. The diversity controller may control the way of combining these samples, for example selecting "Maximum Ratio Combining" (MRC), i.e. obtaining weights that maximize the output SNR, selecting "Selection Combining" (SC), i.e. choosing the element with the greatest SNR for further processing or selecting "Equal Gain Combining" (EGC), i.e. setting unit gain at each element. The diversity controller may further control the power of the diversity receiver by turning off receiver circuits which provide poor SNRs or BERs in order to save power and by turning on receiver circuits which provide good SNRs or BERs in order to improve the detection quality of the diversity receiver. The diversity controller may control the power switching of the receiver circuits depending on a quality measure of the quality estimator.

Operation of a user equipment (UE) may be summarized generally as falling under two modes (1) a data channel mode in which a dedicated DCH connection is established, and (2) an idle mode in which no dedicated DCH connection exists. During the idle mode, the UE periodically measures the reception quality, and if the reception quality drops below a certain threshold, as specified by the network, some corrective action, such as a handover to another network, is initiated. A handover to another network is not necessarily an issue for the customer for voice calls because often such a change (e.g., handover from a 3G network to a 2G network) is transparent to the customer. However, such a handover can be disadvantageous for a data call that requires significantly higher data throughput. In addition, for a network operator, switching to another network that is not your own may incur significant roaming charges and is thus undesirable.

In the Idle mode reception quality measurements are made, however such measurements are not made using receive diversity. Using receive diversity in the idle mode can improve the reception quality measurement. Consequently, this improvement effectively increases the coverage of a given network by reducing a frequency of a network handover. The improvement in reception quality also improves the reception of pagings and thus results in a reduction in missed calls.

Enabling receive diversity throughout the entire idle mode would enable the above-described improvements, however, receive diversity significantly increases power consumption (e.g., up to about a 30% increase), and thus drastically reduces the standby time of the UE. The present disclosure is directed to a system and method of dynamically enabling and disabling receive diversity (RxDiv) when necessary in the idle mode to achieve the benefits highlighted above while minimizing the deleterious increase in power consumption. The present disclosure selectively enables and disables RxDiv based on the availability of reception quality measurements associated with an active antenna and on RxDiv measurements, as will be more fully appreciated in the discussion accompanying the figures below.

FIG. 1 schematically illustrates a portion of user equipment (UE) 100 according to one embodiment, in particular a user equipment 100 which is configured to dynamically enable and disable receive diversity (RxDiv) in the idle mode. The UE 100, which may also be referred to as a receiver, includes a plurality of receiver chains 102a, 102b that receive an incoming signal (i.e., a downlink signal) at a respective antenna 104a, 104b. In one embodiment, the receiver 100 has two receiver chains, 102a, 102b, however, "n" receiver chains, wherein "n" is an integer greater than one, may be employed in the receiver and is contemplated by the present disclosure. The receiver chains 102a, 102b, perform various receive functions as highlighted above, such as demodulating the received signal, etc. The received signal of each receiver chain 102a, 102b is evaluated by a respective quality estimation unit 106a, 106b. As discussed generally above, the quality estimation units 106a, 106b measure a characteristic of the received signal and communicate that characteristic to a diversity controller 108 as a reception quality value 110a, 110b.

Still referring to FIG. 1, in the idle mode (i.e., when no dedicated DCH connection is established) the diversity controller 108 receives a reception quality value 110a or 110b from one of the quality estimators 106a or 106b, respectively, depending on which of the two antennas 104a and 104b is active. The diversity controller 108 compares the reception quality value to a predetermined threshold value. If the reception quality falls below the predetermined threshold value in the idle mode, the diversity controller 108 activates the RxDiv mode by control signals 114a or 114b to activate or enable the other of the receiver chains that was previously inactive. For example, if the first receiver chain 102a was originally active and the receiver chain 102b was inactive, upon the reception quality value received at 106a falling below the predetermined threshold value, the diversity controller 108 enables the second receiver chain 102b via control signal 114b such that two receiver chains are active, thus establishing a receive diversity (RxDiv) condition.

In one example, only two receiver chains exist. More generally, a plurality of receiver chains may exist, wherein "n" is greater than one. In the event that three or more receiver chains exist, if the active receiver chain receives a reception quality value that is less than the predetermined threshold value, the diversity controller may activate just one additional receiver chain rather than all of them to see whether a reception quality with just a single additional activated receiver chain is sufficient to provide a reception quality that exceeds the threshold. The diversity controller may limit itself to activating just one additional receiver chain in one embodiment, or may incrementally activate one additional receiver chain at a time until the RxDiv reception quality increases above the threshold in another embodiment. In yet another alternative embodiment, the diversity controller may automatically activate all available receiver chains upon one of them having a reception quality below the threshold in the idle mode. All such variations are contemplated as falling within the scope of the present disclosure.

In one embodiment, the diversity controller 108 employs a fixed predetermined threshold, while in another embodiment, the diversity controller 108 employs a predetermined threshold from a memory unit 112 that contains a plurality of different values in a table, for example. In one embodiment, the diversity controller 108 selects a particular threshold value from the memory 112 based on the network presently utilized by the UE. For example, if a given network specifies that if a reception quality falls below −80 dBm, a handover to another network must take place, the diversity controller may select a predetermined threshold of −80 dBm, or based on a user-specified safety guardband, the diversity controller 108 may select a threshold value of −78 dBm from the memory 112. In another embodiment, if the receiver 100 is operating in another network that employs a different threshold value, the diversity controller 108 may select a different threshold value from the memory 112.

As can be seen from FIG. 1, the receiver 100 selectively activates the receive diversity mode based on the reception quality via the diversity controller 108. Further, because the diversity controller 108 relies on the reception quality measurement(s) from the quality estimation units 106a, 106b, receive diversity is only employed in the idle mode when needed, and thus the amount of power consumption is minimized. In addition, after the receiver 100 enters the diversity mode, the reception quality of RxDiv is evaluated, and if the reception quality of the receiver in RxDiv falls below the predetermined threshold level, the corrective action dictated by the network in which the UE resides will then take place. For example, in the event the RxDiv reception quality falls below the threshold, a network handover of the UE will then take place (e.g., a handover from the 3G network to a 2G network).

In addition to the above, once the receiver 100 enters RxDiv, the quality estimation units 106a, 106b continue to report the reception quality in RxDiv as well as the reception quality of the individual receiver chains associated with the active antennas. If the reception quality of one of the active antennas is sufficiently good (i.e., greater than the predetermined threshold), the diversity controller 108 will keep the receiver chain associated with the one antenna active, while deactivating the other presently active receiver chains. In this manner, the diversity controller 108 actively evaluates the reception quality of the system, and dynamically activates and deactivates receiver chains in the idle mode to improve reception quality only when needed. In one example, if during RxDiv the reception quality is above the threshold, and the reception quality of the receiver chain 102b associated with antenna 104b is also above the threshold, but the reception quality of the receiver chain 102a associated with the antenna 104a is below the threshold, the diversity controller 108 will deactivate the receiver chain 102a while keeping the receiver chain 102b active, thereby exiting the RxDiv state in the idle mode. In the above manner, the diversity controller can move dynamically enable and disable RxDiv to improve reception quality when needed, yet do so while minimizing power consumption in the idle mode.

Figure 2:
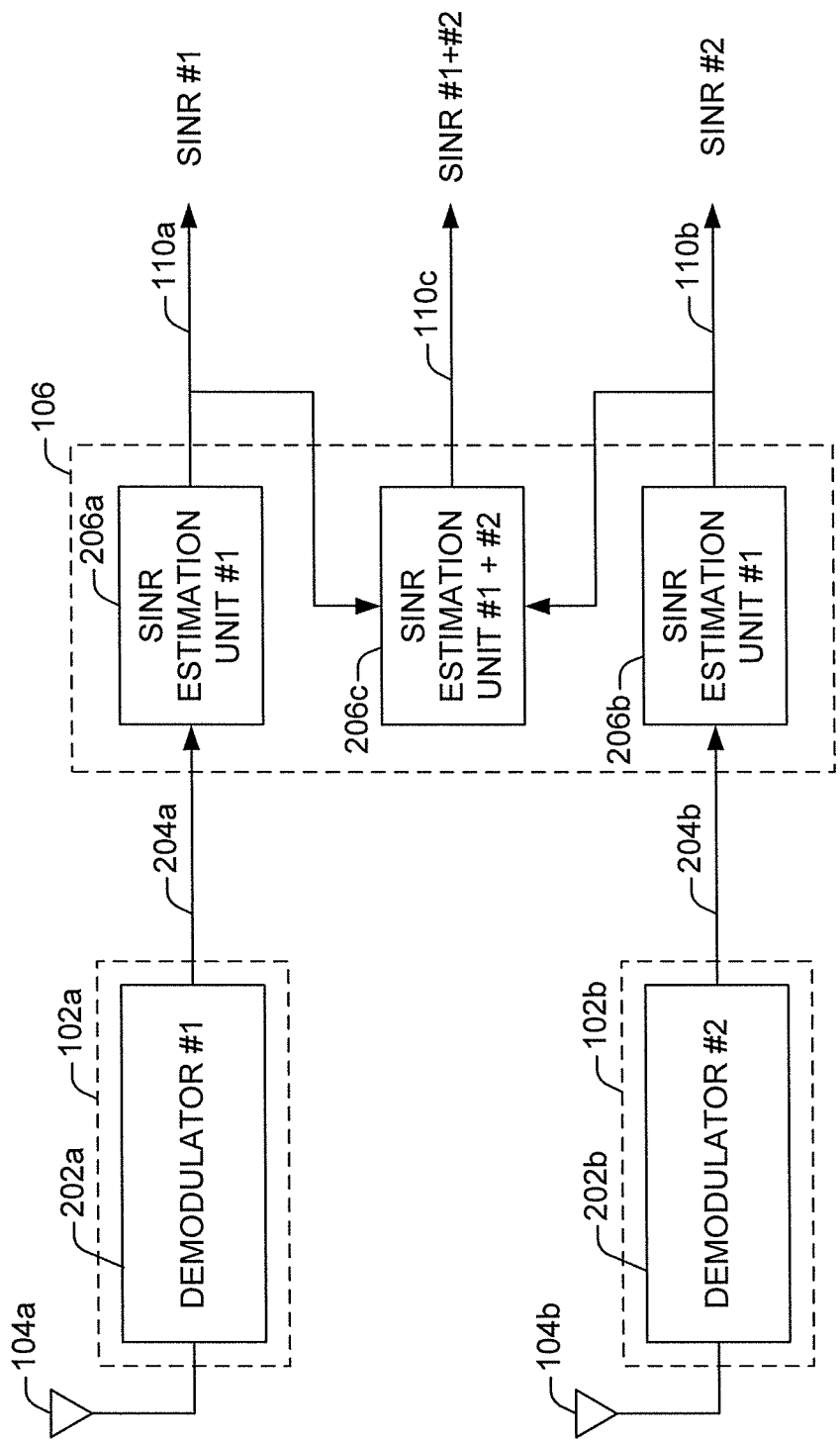
FIG. 2 is a block diagram illustrating a portion of the receiver of FIG. 1.

Referring now to FIG. 2, a portion of the receiver 100 shown in FIG. 1 is illustrated in somewhat greater detail. For example, in the receiver chain 102a a demodulator 202a is illustrated. The receiver chain 102a may include other components as well. The received demodulated signal is noted at reference number 204a, and is provided to the quality estimation unit 106 that, in one embodiment, includes a plurality of measurements units 206a, 206b and 206c. Likewise, the second receiver chain 102b includes a second demodulator 204b, which is fed to the quality estimation unit 106.

In one embodiment, the receiver 100 includes only measurement units 206a and 206b that operate to measure a reception quality of just one receiver chain associated therewith. In such instances, during the RxDiv condition the diversity controller 108 employs the individual antenna reception quality measurements to generate a RxDiv reception quality. More detail regarding this feature will be provided infra. In another embodiment, the quality estimation unit 106 includes a third measurement unit 206c that receives the reception quality data from the other measurement units 206a and 206b. In this manner a more sophisticated RxDiv reception quality determination can be made.

In the example illustrated in FIG. 2, the reception quality is evaluated using a signal-to-interference-plus-noise ratio (SINR) calculation. Alternatively, a signal-to-noise ratio (SNR) or a signal power (S) measurement may be made, or any other suitable measurement that characterizes the reception quality may be employed and all such alternatives are contemplated as falling within the scope of the present disclosure.

Figure 3:
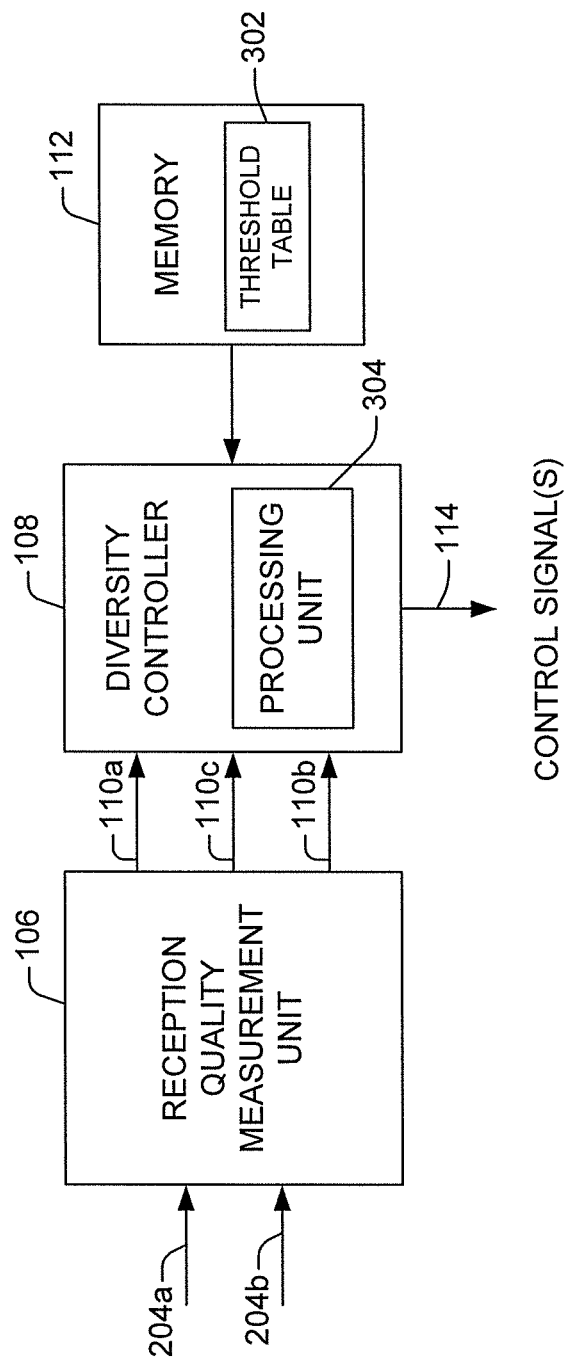
FIG. 3 is a block diagram illustrating a portion of the receiver of FIG. 1.

FIG. 3 illustrates another portion of the receiver 100 of FIG. 1 in greater detail. In FIG. 3 the diversity controller 108 receives from the reception quality measurement unit 106 either a single reception quality parameter 110c or a plurality of quality reception parameters 110a and 110b that comprise values associated with individual antennas 104a, 104b. In one embodiment of the disclosure, quality parameter 110C may comprise a combined quality parameter (e.g., a SNR) when the receiver is in receive diversity. In one example, this may simply a sum of each of the active receiver chains. The diversity controller 108 utilizes the data it receives from the reception quality measurement unit 106 to dynamically enable or disable RxDiv in the idle mode.

In the instance when the UE 100 enters the idle mode, no RxDiv exists, and thus either antenna 104a or antenna 104b is active. Thus the diversity controller 108 operates to deactivate one of the receiver chains 102a, 102b. In one example, antenna 104a and receiver chain 102a are active, and antenna 104b and receiver chain 102b are inactive. Thus during the idle mode the reception quality measurement unit 106 evaluates the reception quality thereof, and communicates the reception quality at 110a to the diversity controller 108.

Figure 4:
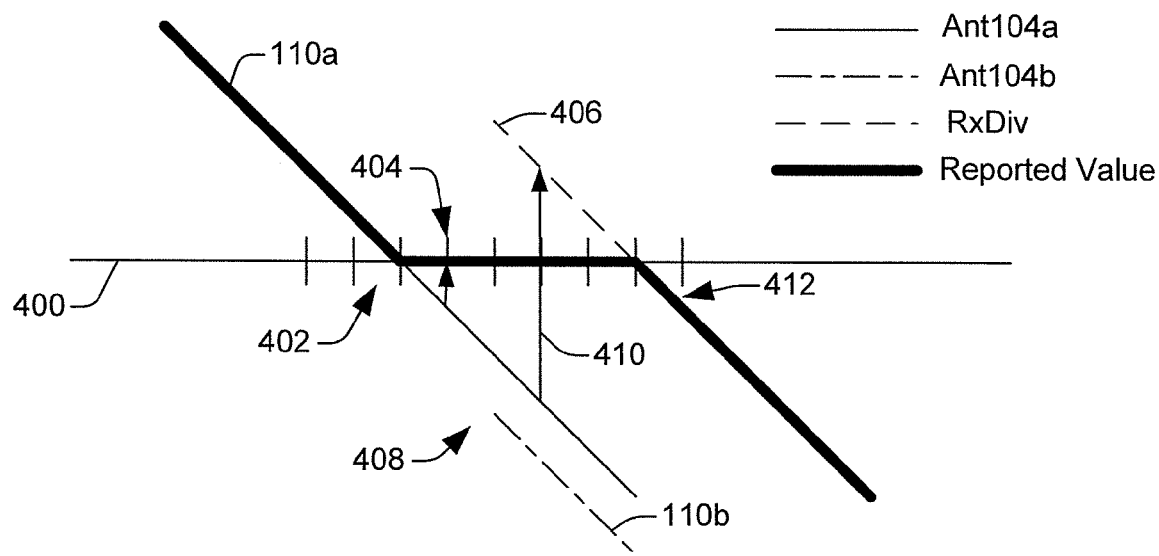
FIG. 4 is a graph illustrating an example of selectively activating receive diversity in an idle mode in a user equipment according to one embodiment.

The diversity controller 108 compares the reception quality value 110a, or a value associated therewith, to a predetermined threshold 400, as illustrated in FIG. 4. In the embodiment of FIG. 4, the predetermined threshold 400 is a value received from the threshold table 302 from the memory 112 illustrated in FIG. 3. In this embodiment, the threshold 400 is the same threshold dictated by the network to force a network handover, however, this threshold may differ, as will be seen in a further embodiment later. As can be seen in FIG. 4, at a time period before 402, the reception quality value 110a is greater than the threshold 400, and thus the diversity controller 108 makes no changes. At measurement time instant 404 the reception quality value 110a drops below the predetermined threshold 400, and the diversity controller 108 initiates an activation of receive diversity RxDiv by generating and transmitting a control signal 114b that activates the second receiver chain 102b. Consequently, at the next measurement instant an RxDiv quality reception value 406 is calculated by the diversity controller 108 based on the reception quality values from antennas 104a and 104b. As can be seen at 408, while the quality reception values of both antenna 104a and antenna 104b are each below the threshold value 400, the RxDiv value 406 is above the threshold 400, and thus a handover to another network is avoided that would otherwise have occurred. The improvement in reception quality between the single antenna 104a and that achieved by the reception diversity is referred to as the RxDiv gain, and is shown at reference numeral 410 in FIG. 4.

As illustrated in FIG. 4, the RxDiv value 406 maintains a value greater to or equal than the predetermined threshold 400 until measurement time instant 412, when the value 406 drops below the threshold 400. At such time, the diversity controller 108 initiates a network handover as the corrective action to remedy the problem of unacceptable reception quality. If, however, the RxDiv value 406 had stayed above the threshold 400, a network handover would have advantageously been avoided.

According to one embodiment of the disclosure, the diversity controller 108 comprises a processing unit 304, wherein an RxDiv value 406 is calculated using the individual reception quality values 110a and 110b from the active receiver chains 102 and 102b in receiver diversity mode. In one embodiment the processing unit 304 calculates RxDiv value 406 as:

$$MeasRxDiv=MeasAnt104a+MeasAnt104b=110a+110b.$$

Alternatively, RxDiv value 406 is calculated as follows:

$$MeasRxDiv=\max(MeasAnt104a,MeasAnt104b)+3\ dB,$$

or $$MeasRxDiv=\text{mean}(MeasAnt104a,MeasAnt104b)+3\ dB,\ or$$

$$MeasRxDiv=\min(MeasAnt104a,MeasAnt104b)+3\ dB.$$

The diversity controller 108 employs the processing unit 304 to calculate the RxDiv value 406 (MeasRxDiv) and then initiate a corrective action only if that value falls below the predetermined threshold.

Still referring to FIG. 4, note that at a time instant after 404, the reception quality calculated by the diversity controller is discontinuous, wherein at time instant 404, the value of antenna 104a dropped below the threshold 400, and at the next time instant, upon activation of receive diversity, the value of RxDiv is substantially above the threshold 400. To avoid triggering a handover at 404 due to the reception quality falling below the threshold 400, in one embodiment the diversity controller 108 reports to the network a value equivalent to the threshold 400, i.e., a "fake" reporting at 404 to avoid triggering a handover and allowing time to initiate receiver diversity. This is reflected in the bold line in FIG. 4 as indicative of the value reported by the diversity controller 108 to the network and to other internal circuitry of the receiver 100 while the actual value may differ. In addition, to avoid the large, substantially discontinuous jumps in reporting reception quality to other internal receiver circuitry, in one embodiment, after the activation of RxDiv has dramatically increased reception quality, the diversity controller 108 reports a reception quality equivalent to the threshold value 400 as opposed to the RxDiv value that is substantially greater than the threshold to avoid the discontinuity in reporting.

Figure 5:
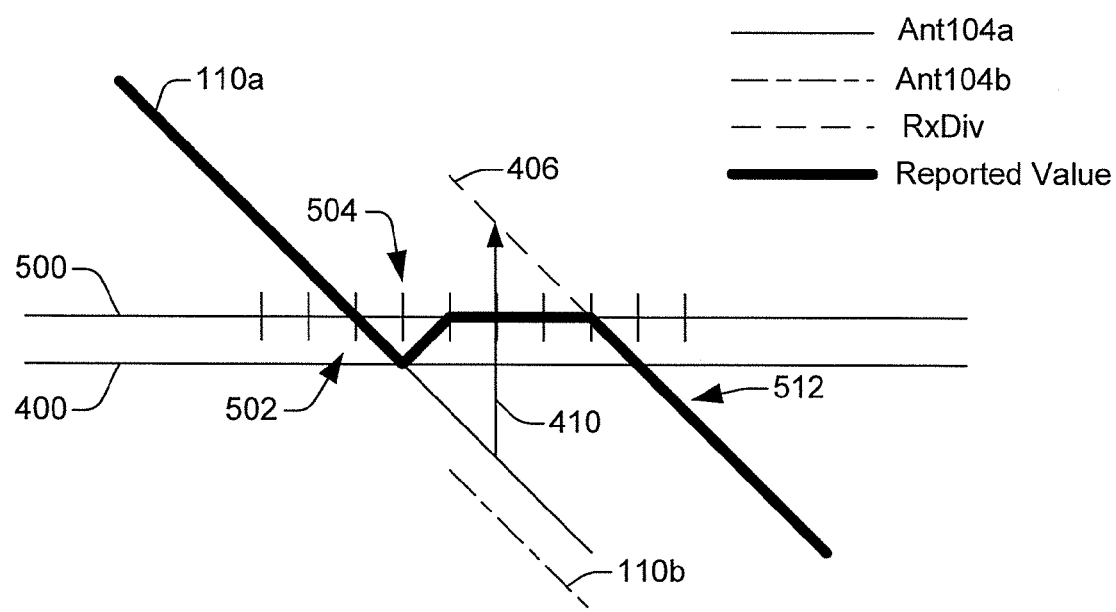
FIG. 5 is a graph illustrating an example of selectively deactivating receive diversity in an idle mode in a user equipment according to one embodiment.

In an alternative embodiment of the disclosure illustrated in FIG. 5, a predetermined threshold 500 is selected that is greater than the threshold 400 dictated by the network. In this embodiment, the receiver 100 has one antenna 104a active and a reception quality value 110a is communicated to the diversity controller 108. At measurement time instant 504, the reception value 110a falls below the predetermined threshold 500 specified by the UE, but is not below the network mandated threshold 400. In this context, the network threshold 400 may be considered a first predetermined threshold and the internal receiver threshold 500 is a second predetermined threshold that is greater than the first predetermined threshold. Once the reception quality 110a of the single antenna 104a drops below the second threshold 500, the diversity controller 108 activates or enables receive diversity by activating the second receiver chain 102b via a control signal 114b. At the next measurement time instant after 504 RxDiv has been activated and the diversity controller 108 receives reception quality values 110a and 110b from both active antennas 104a and 104b. From these values a MeasRxDiv is calculated and is shown in FIG. 5 at reference numeral 406. Since the diversity controller 108 enables receive diversity upon crossing the second threshold 500, the improvement in reception quality occurs before the first threshold 400 is crossed, and no "fake" reporting occurs at 504, in contrast to the embodiment of FIG. 4. The diversity controller 108 in FIG. 5, however, does continue to report a reception quality at the second predetermined threshold 500 to internal receiver circuitry to avoid the substantial discontinuity jump in reception quality that in actuality occurred after time instant 504 due to the RxDiv.

Due to the receive diversity RxDiv value 406, the receiver 100 avoids an unnecessary network handover. Over time, if the reception quality in RxDiv falls below the first predetermined threshold 400 (i.e., the network mandated threshold), for example, as shown at reference numeral 512, the diversity controller 108 reports the value and initiates a network handover.

Figure 6:
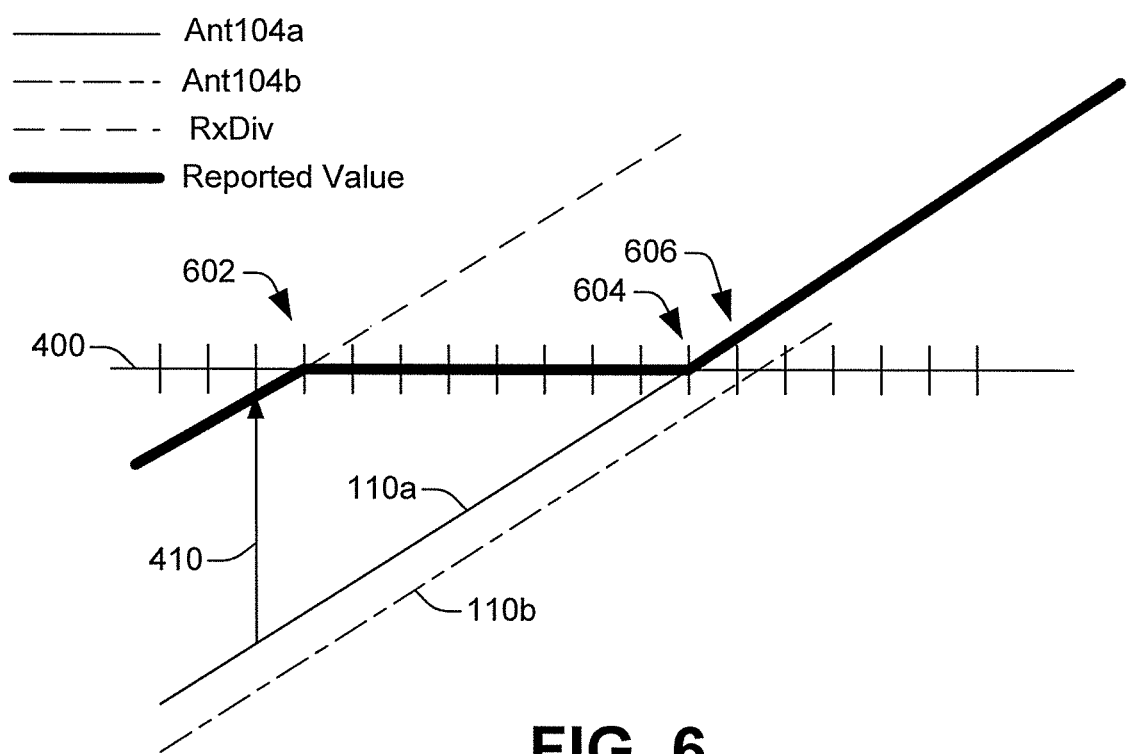
FIG. 6 is a graph illustrating a reception quality that meets a threshold.

Once a network handover has occurred, it is still desirable to return back to the original network if possible, for example, to discontinue incurring roaming charges or to utilize the higher throughput of the original network. In any event, the diversity controller 108 periodically activates RxDiv and makes a measurement 406. If the MeasRxDiv values are below the threshold 400, no action is taken, however, if the value 406 reaches the threshold 400 (e.g., as shown at measurement time instant 602), the diversity controller 108 initiates a network handover back to the original network. In addition, while RxDiv is active, the diversity controller 108 continues to evaluate the reception quality values 110a and 110b of the individual antennas 104a and 104b. If either one of the antennas exhibit a reception quality 110a and 110b that meets the threshold 400, the diversity controller 108 deactivates receive diversity by deactivating the receiver chain that does not exhibit a reception quality above the threshold. In the example illustrated in FIG. 6, at measurement time instant 604 the first antenna 104a and first receiver chains 102a exhibits a reception quality value 110a that meets the threshold 400. At that time the diversity controller 108 deactivates the receiver chain 102b to disable receiver diversity and thus the actual reception quality 110a of the first antenna 104a is reported at the next measurement instant 606. Note that in the embodiment of FIG. 6 the threshold at which RxDiv is deactivated is the network threshold 400, however, the threshold may alternatively be set slightly higher than the threshold 400 to provide some hysteresis and avoid some unique situations when RxDiv gets repeatedly activated and deactivated (i.e., when the reception quality value 110a bounces up and down about the threshold 400).

Figure 7:
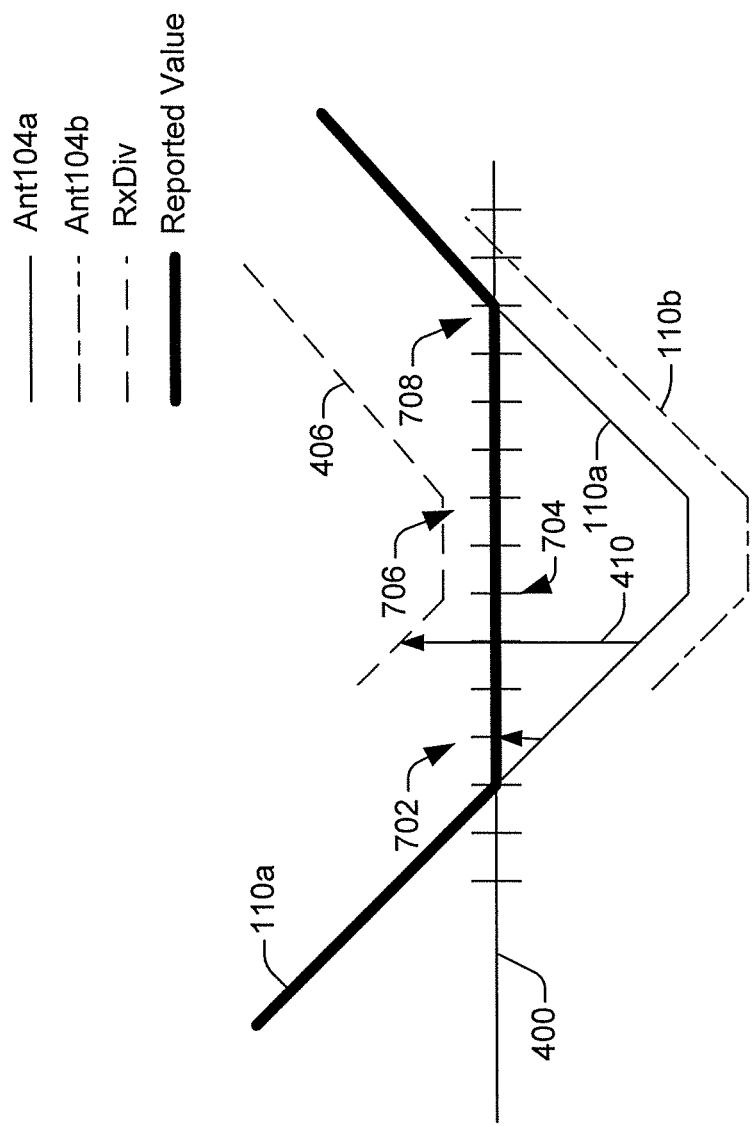
FIG. 7 is a graph illustrating operation of the diversity controller.

Referencing FIG. 7, a situation exists, wherein the diversity controller 108 has dynamically enabled RxDiv at a time measurement instant 702 when the reception quality value 110a of the receiver chain 102a falls below the predetermined threshold 400. At the next measurement instant the RxDiv gain 410 results in a MeasRxDiv value 406 that substantially exceeds the threshold and a network handover is avoided. Unlike the example in FIG. 4, at time measurement instant 704, the reception quality 110a of the first antenna 104a stops declining and levels out, and at time measurement instant 706, the reception quality value 110a begins increasing. During this time period RxDiv 406 still exceeds the predetermined threshold 400 and so a network handover is avoided. At time instant 708, the reception quality value 110a of the antenna 104a reaches the threshold 400, and the diversity controller 108 disables receiver diversity by deactivating the second receiver chain 102b associated with the second antenna 104b. Thus the embodiment of FIG. 7 illustrates that throughout the idle mode, the diversity controller 108 continues to dynamically activate and deactivate RxDiv to avoid unnecessary network handovers while concurrently attempting to minimize power consumption.

Figure 8:
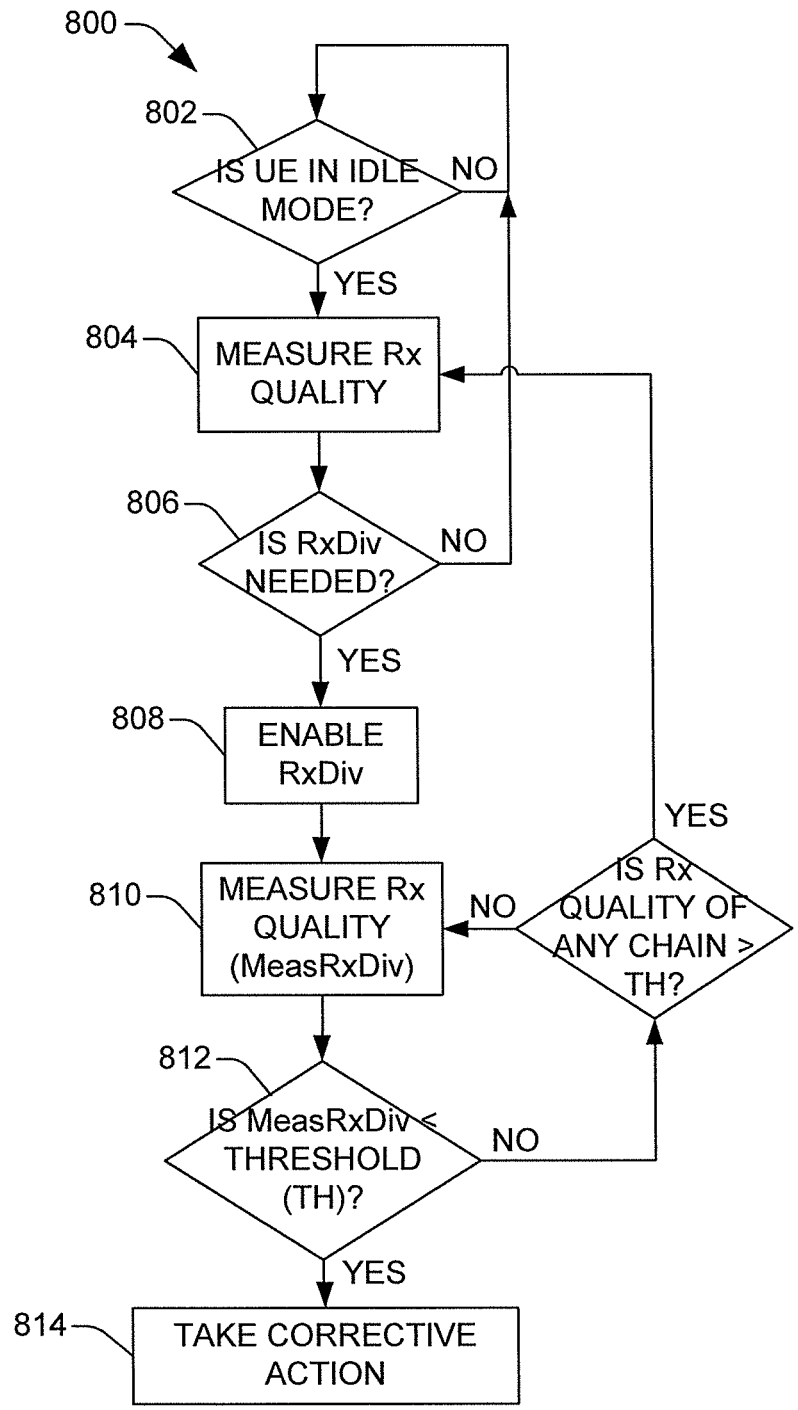
FIG. 8 is a flow diagram illustrating a method of operating a receiver.

According to another embodiment of the disclosure, a method 800 of operating a receiver in an idle mode is provided in conjunction with the flow chart of FIG. 8. While the exemplary method 800 is illustrated and described below as a series of acts or events, it will be appreciated that the present disclosure is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present disclosure.

The method 800 starts at 802, wherein a query is made whether the UE is in the idle mode. In one embodiment of the disclosure, the idle mode exists any time a dedicated DCH channel is not established with the UE. If the UE is not in an idle mode (NO at 802), the method 800 returns to the beginning and the query is repeated. If the UE is in the idle mode (YES at 802), a reception quality is measured at 804. When the UE is in the idle mode, receive diversity is not enabled, so the UE will receive a reception quality value associated with an active receiver chain. In one embodiment, a system such as that illustrated in FIG. 1 may be employed, wherein a reception quality value 110a is received if a first receiver chain 102a is active while other receiver chains (e.g., 102b) are inactive. If the determination is negative (NO at 806), the method 800 returns to 802.

At 806 a determination is made, based on the received reception quality value at 804, whether receive diversity is needed. If the determination is affirmative (YES at 806), the method 800 continues at 808, wherein receive diversity is enabled. In one embodiment, a diversity controller such as controller 108 in FIG. 1, compares the received reception quality value (e.g., 110a) to a predetermined threshold (e.g., from a memory 112), and enables RxDiv if the reception quality falls below the threshold. In one embodiment, this threshold is a value dictated by the network; alternatively the threshold may be guardbanded and be a value slightly greater than that dictated by the network.

The method 800 continues at 810, wherein the reception quality in receive diversity (MeasRxDiv) is measured. As highlighted above, the reception quality can be measured in one embodiment as MeasRxDiv in any number of different ways using reception quality values of individual active antennas, or a more sophisticated method may be employed. This measured reception quality in RxDiv is then compared to the predetermined threshold at 812. In one embodiment the reception quality value can be an SNR, a signal power S, or other parameter that reflects reception quality. If MeasRxDiv falls below the threshold (YES at 812), corrective action is taken by the UE at 814. In one embodiment, the UE initiates a network handover. If the measured receive diversity reception quality value MeasRxDiv is not below the threshold (NO at 812), the diversity controller maintains the UE in receive diversity mode, but also continues to evaluate the reception quality of each active receiver chain. If the reception quality of either receiver chain rises above the threshold (YES at 816), the receive diversity is disabled at 818, and the method returns to 804. If, however, no active receiver chain exhibits a reception quality above the threshold (NO at 816), the method 800 returns to 810, wherein MeasRxDiv continues to be monitored. In the above embodiment, the threshold employed at 816 is the same network threshold, however, in an alternative embodiment, a different (e.g., higher) threshold may be employed as hysteresis.

While a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it should be understood that embodiments of the invention may be implemented in discrete circuits, partially integrated circuits or fully integrated circuits or programming means. Also, the terms "exemplary", "for example" and "e.g." are merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

Although specific embodiments have been illustrated and described herein, it will be appreciated by those of ordinary skill in the art that a variety of alternate and/or equivalent implementations may be substituted for the specific embodiments shown and described without departing from the scope of the present invention. For instance, implementations described in the context of a user equipment could be applied to WCDMA transceivers, UMTS transceivers or to mobile communication transceivers relating to other technical standards such as e.g. GSM, LTE or derivatives thereof or applying other multiple access schemes such as e.g. TDMA, FDMA etc. This application is intended to cover any adaptations or variations of the specific embodiments discussed herein. Therefore, it is intended that this invention be limited only by the claims and the equivalents thereof.

What is claimed is:

1. A method of evaluating a reception quality of a receiver, comprising:
   determining whether the receiver is in an idle mode;
   if the receiver is in the idle mode, determining a reception quality of the receiver using a measurement from a single active receiver chain of a plurality of receiver chains of the receiver; and
   activating receiver diversity by incrementally activating at least a second receiver chain of the plurality of receiver chains of the receiver to have a plurality of active receiver chains, in the idle mode if the measurement from the single active receiver chain of the receiver is below an internal threshold and above a network threshold until the reception quality of the receiver increases above the internal threshold.

2. The method of claim 1, further comprising:
   determining the reception quality of the receiver using a measurement from all active receiver chains of the receiver during the idle mode upon receiver diversity being activated; and
   initiating corrective action by the receiver if the evaluated reception quality with activated receiver diversity is below the network threshold.

3. The method of claim 2, wherein the corrective action by the receiver comprises a handover from a present network to a different network.

4. The method of claim 2, further comprising deactivating receiver diversity by deactivating one of the single active receiver chain and the second receiver chain in the idle mode if the chain measurements of the reception quality associated with one or more of the active receiver chains of the single active receiver chain or the second receiver chain is greater than a third predetermined threshold.

5. The method of claim 4, wherein the third predetermined reception quality threshold is greater than the network threshold.

6. The method of claim 2, wherein determining the reception quality of the receiver from all the active receiver chains of the receiver upon receiver diversity being activated comprises:
   measuring a first reception quality parameter associated with a first receiver chain of the active receiver chains;
   measuring a second reception quality parameter associated with a second receiver chain of the active receiver chains; and
   using the first reception quality parameter and the second reception quality parameter to generate a receiver diversity (RxDiv) measurement, wherein the RxDiv measurement comprises the determined reception quality with receiver diversity activated.

7. The method of claim 6, wherein the RxDiv measurement comprises one of:
   an addition of the first reception quality parameter and the second reception quality parameter;
   a larger of the first reception quality parameter and the second reception quality parameter;
   a smaller of the first reception quality parameter and the second reception quality parameter; and
   a mean of the first reception quality parameter and the second reception quality parameter.

8. The method of claim 6, wherein the RxDiv measurement comprises a quality parameter associated with both the first receiver chain and the second receiver chain.

9. The method of claim 1, wherein determining whether the receiver is in the idle mode comprises determining that no DCH connection is established in the receiver.

10. The method of claim 1, wherein determining the reception quality of the receiver using a measurement from the single active receiver chain comprises determining a signal power or a signal-to-noise ratio (SNR) of a received signal from the single active receiver chain.

11. The method of claim 1, wherein the single active receiver chain comprises a condition of the receiver, wherein receiver circuits of the single active receiver chain are turned on, and wherein one or more of the other receiver chains of the plurality of receiver chains have receiver circuits that are turned off.

12. A receiver, comprising:

a plurality of receiver chains configured to interface with a plurality of antennas, respectively, and receive a plurality of signals therefrom, respectively;

a reception quality estimation unit configured to determine a reception quality of a single active receiver chain of the plurality of receiver chains when the receiver is in an idle mode, wherein one or more of the other receiver chains of the plurality of receiver chains excluding the single active receiver chain are inactive, wherein receiver circuits within the one or more of the other receiver chains are turned off; and a diversity controller configured to selectively and incrementally activate at least a second receiver chain of the plurality of receiver chains in the idle mode based on the determined reception quality from the reception quality estimation unit being below an internal threshold and above a network threshold until the reception quality increases above the internal threshold;

wherein selectively activating the at least a second receiver chain comprises turning on the receiver circuits in the at least a second receiver chain.

13. The receiver of claim 12, wherein the reception quality estimation unit is configured to determine the reception quality by measuring a signal power or a signal-to-noise ratio (SNR) of a signal from the single active receive chain.

14. The receiver of claim 12, wherein the diversity controller is configured to activate the at least a second receiver chain if the determined reception quality is below the network threshold.

15. The receiver of claim 12, wherein the reception quality estimation unit is configured to determine a reception quality associated with all active receiver chains when the diversity controller has activated the at least a second receiver chain, and wherein the diversity controller is further configured to initiate a corrective action if after activating the at least a second receiver chain the determined reception quality is below the network threshold.

16. The receiver of claim 15, wherein the internal threshold and the network threshold are the same.

17. The receiver of claim 12, wherein the diversity controller is configured to deactivate receiver diversity by deactivating one of the first receiver chain and the second receiver chain if the reception quality of a remaining activated receiver chain of the first receiver chain and the second receiver chain is greater than a third predetermined threshold.

18. The receiver of claim 17, wherein if both the first receiver chain and the second receiver chain have a reception quality greater than the third predetermined threshold the diversity controller is configured to deactivate the receiver chain having a lesser reception quality than the other.

19. A receiver, comprising:

a plurality of receiver chains configured to interface with a plurality of antennas, respectively, and receive a plurality of signals therefrom, respectively; and a diversity controller configured to selectively activate and deactivate one or more receiver chains of the plurality of receiver chains in an idle mode if a reception quality of the receiver is below an internal threshold and above a network threshold until the reception quality of the receiver increases above the internal threshold to prevent unnecessary handovers from a present network to another network;

wherein the diversity controller is configured to selectively activate one or more receiver chains by turning on receiver circuits of the one or more receiver chains, and selectively deactivate one or more receiver chains by turning off the receiver circuits of the one or more receiver chains.

20. The receiver of claim 19, further comprising a quality estimation unit configured to determine the reception quality of the receiver in the idle mode, wherein the diversity controller is configured to selectively activate and deactivate one or more receiver chains in the idle mode based on the determined reception quality.

\* \* \* \* \*